Dec. 11, 1934.  P. L. BELTON ET AL  1,983,963
RUBBER PRODUCT HAVING ROUGHENED OR CRINKLED SURFACES
AND METHOD FOR PRODUCING THE SAME
Filed May 11, 1933

INVENTORS
PORTER LEE BELTON AND
OSCAR LEROY BELTON
BY

ATTORNEYS

Patented Dec. 11, 1934

1,983,963

UNITED STATES PATENT OFFICE 1,983,963

RUBBER PRODUCT HAVING ROUGHENED OR CRINKLED SURFACES AND METHOD FOR PRODUCING THE SAME

Porter Lee Belton and Oscar Leroy Belton, Barberton, Ohio, assignors to Seiberling Latex Products Company, Akron, Ohio, a corporation of Ohio Application May 11, 1933, Serial No. 670,424

10 Claims. (Cl. 18—58)

This invention relates to the provision of rubber products with roughened or crinkled surface formations.

In the manufacture of various rubber articles, it is often desirable, either from the standpoint of ornamentation or for utilitarian purposes, to provide such products with roughened or crinkled surfaces over all or a part of the rubber product. The general purpose of the present invention is to provide a rubber product and method for making the same whereby the desired roughened or crinkled surface is effectively produced in a simple, economical manner.

The foregoing and other purposes of the invention are obtained in the rubber product and by the method described in the succeeding paragraphs. It is to be understood that the invention is not to be limited to the particular form thereof and procedure for carrying out the same as set forth herein. A glove made in accordance with the invention is illustrated in the accompanying drawing and described below.—

Of the accompanying drawing.

Figure 1:
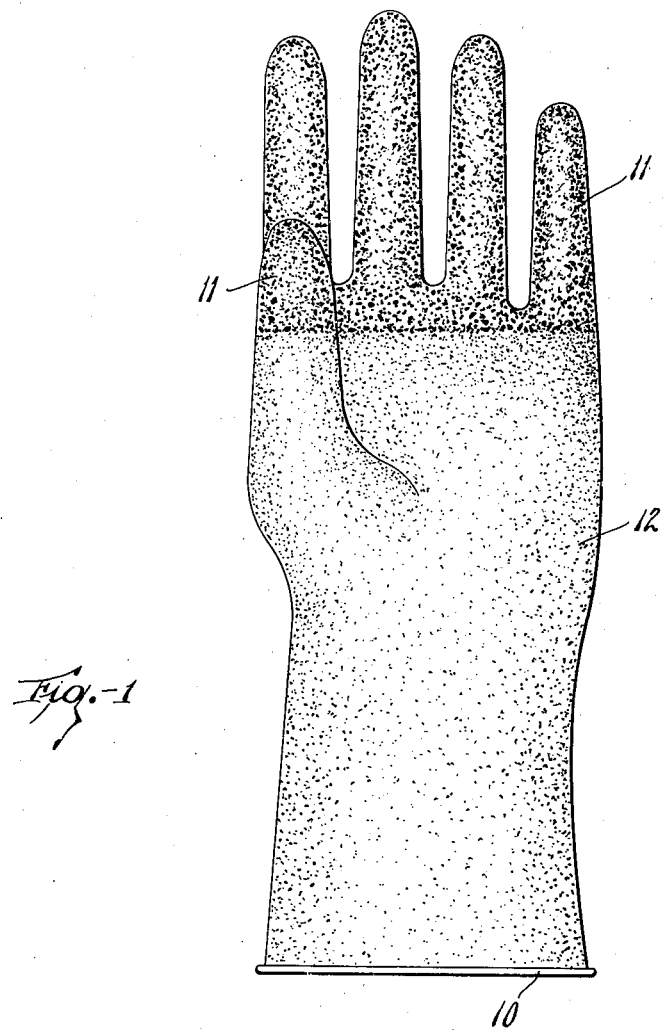
Figure 1 is an elevation of a glove made by the use of the invention.
Figure 2:
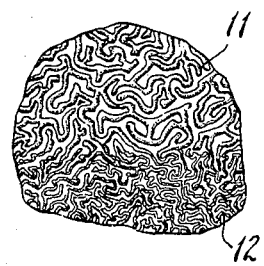
Figure 2 is an enlarged view of a portion of the glove in which it is attempted to illustrate the nature of the surface produced on the glove by the method of the invention.

In carrying out the invention, a rubber product of a desired form or sheet rubber material or the like is made in any of the usual ways such as by depositing rubber, by dipping, by electrolysis, by coagulation of latex, on forms or surfaces to form the rubber product or material, or by the use of crude rubber milled and calendared, spread or otherwise formed, the various rubber products and materials being made of rubber whether compounded or not with vulcanizing or other compounding ingredients depending upon the properties desired in the products or materials.

The products or materials, after being prepared for vulcanization in any well-known or suitable manner, are so subjected to vulcanization as to cause a skin of vulcanized rubber to be formed over the surface of the product or material which otherwise remains substantially unvulcanized. This can be accomplished when the rubber materials contain no vulcanizing ingredients by treating the rubber articles with suitable vulcanizing mediums such as sulphur chloride fumes in a heated room or by means of the well-known "Peachy" process.

The period of vulcanization in this case is substantially shorter than that required for complete vulcanization, periods of from five to eight minutes being sufficient to produce a vulcanized skin on the article of the required thickness, the thicker the skin produced in this manner the rougher or more crinkled will be the final product secured. In the case of rubber compounds containing vulcanizing ingredients, these may be subjected to either heat or heat and pressure either directly or indirectly applied thereto from heated fluids, electrical heating, etc., for corresponding periods of time to produce the vulcanized skin over the surface of the rubber. The inside or underside of the product or material may in this case be protected from the direct action of the heating medium or may even be artificially cooled to prevent substantial vulcanization in the body of the rubber article or material.

After a vulcanized skin of rubber is thus formed over the product or material, the vulcanized surface of the material is then treated with a rubber solvent or swelling agent such as naphtha, benzol, gasoline, etc., either by partial or complete immersion therein of the material or portions thereof desired to be roughened or crinkled or by subjecting the article or material to the fumes of such solvents or swelling agents or by subjecting parts to immersion and parts to the fumes. The rubber articles may be so treated from three to five minutes or longer and the extent of crinkling which will subsequently be produced depends to some extent upon the length of time the article is so treated, the longer treatment producing the greater crinkling effect. The crinkling due to fumes will not be so great as that due to actual immersion, and where part of an article is immersed and the other part subjected to the fumes different crinkling effects are obtained.

After this treatment, the articles or materials are preferably dried to remove the solvent or swelling agent. This may be accomplished by heating the articles from ten to fifteen minutes in a dry room at 80° F. The articles or materials are then given a final cure to completely vulcanize the same. This may be accomplished in any suitable way by hot or cold vulcanization methods, depending upon the type of rubber or rubber compounds employed.

In carrying out the invention in the manufacture of rubber gloves with roughened grip portions on the fingers thereof, such as shown in the accompanying drawing, glove forms have rubber deposited thereon either from rubber cement or latex by dipping, spraying, electro-deposition, coagulation or the like. To get the required thickness of the rubber on the forms the rubber may be deposited thereon in a plurality of coats and dried between each coating. The ring or bead 10 may then be rolled at the wrist of each form. After the ring rolling operation the rubber may be given a final drying. The forms may then be exposed to the action of a vulcanizing medium such as sulphur chloride fumes in a heated chamber at about 230° to 240° F. for a period of five to eight minutes or more. The length of time of this vulcanization may be varied somewhat with variations in humidity to obtain the required thickness of vulcanized skin to secure the required degree of roughness in the finished goods. Vulcanization for the periods stated forms a comparatively thin vulcanized skin of rubber over the gloves. The forms are then partly immersed with their finger portions in a suitable solution or swelling agent such as naphtha for a sufficient period depending upon the roughness desired. In the final product this produces the comparatively roughly crinkled portion 11 on the fingers and thumb of the glove. The upper parts of the forms above the solvent or swelling agent in which the fingers are immersed are subject to the fumes of the naphtha and this produces a very slight crinkling of the un-immersed portions of the rubber as at 12 providing a glove with a texture which improves its appearance. The gloves are then dried from ten to fifteen minutes at 80° F. and may be subjected to a final cure, for example, in a sulphur chloride solution or otherwise, as will be understood by skilled artisans.

The method may be employed for producing various designs comprising lines or patches of more or less roughened or crinkled material on a rubber article by covering portions of the rubber article with a material impervious to and not attacked by the solvent or swelling agent and allowing the swelling action to take effect only on certain exposed portions of the rubber material. A suitable protecting material is Holland cloth.

Modifications of the invention may be resorted to without departing from the spirit thereof or the scope of the appended claims.

What is claimed is:—

1. That method for producing rubber with a roughened or crinkled surface which comprises partially vulcanizing the rubber to form a skin of rubber over the article, treating said skin of vulcanized rubber with a swelling agent, and then completely vulcanizing the article.

2. That method for making a rubber article with a crinkled or roughened surface which comprises forming the article with a skin of vulcanized rubber, the remainder of the article being substantially unvulcanized, treating said skin of vulcanized rubber with a swelling agent, and completely vulcanizing the article.

3. That method of making a rubber article with a crinkled or roughened surface which comprises depositing rubber on a form, subjecting the rubber on the form to vulcanization to vulcanize a skin of rubber over the article on the form while leaving the inside of the article substantially unvulcanized, treating all or part of the surface of the outside of said articles with a swelling agent, and completely vulcanizing the article.

4. That method of making a glove with roughened or crinkled gripping surfaces on the fingers thereof which comprises depositing the rubber on a glove form, partially vulcanizing said rubber so that a skin of vulcanized rubber forms over the outer surface of the glove, treating the finger portions of said glove with a swelling agent, and completing the vulcanization of said glove.

5. That method of making a rubber article having portions of a surface roughened or crinkled which comprises partially vulcanizing the rubber article to form a skin of vulcanized rubber over said surface, treating said portions of said surface with a swelling agent, and completing the vulcanization of said article.

6. That method of forming a rubber article with portions thereof having a roughened or crinkled surface which comprises partially vulcanizing said article to form a skin of vulcanized rubber over said surface, covering the portions of said surface not desired to be crinkled or roughened with a protective material, treating the exposed portions of said surface with a swelling agent, and completely vulcanizing the article.

7. That method for making a rubber article with surfaces crinkled or roughened to provide different textures which comprises forming the rubber article with a skin of vulcanized rubber, treating certain portions of said skin with a liquid swelling agent, treating other portions of said skin with the fumes or vapor from a swelling agent, and completely vulcanizing said article.

8. That method for making a rubber article with a roughened or crinkled texture which comprises forming said article with a skin of vulcanized rubber, the interior of the article being substantially non-vulcanized, and treating said skin with a swelling agent.

9. A vulcanized rubber article having roughened or crinkled surfaces of different textures provided thereon, the coarser texture being produced by contact with a swelling agent and the finer texture by contact with the fumes or vapor therefrom.

10. A vulcanized rubber glove having finger and palm portions, the outer surfaces of which are roughened or crinkled to provide different textures, the coarser texture being produced by immersion in a swelling agent and the finer texture by contact with the fumes or vapor therefrom.

PORTER LEE BELTON.
OSCAR LEROY BELTON.